Aug. 30, 1932.  A. O. WILLIAMS  1,874,147
COUPLER
Filed March 8, 1929   2 Sheets-Sheet 1

Inventor
Alfred O. Williams
By Brown, Jackson, Boettcher & Dienner
Attys.

Aug. 30, 1932.  A. O. WILLIAMS  1,874,147
COUPLER
Filed March 8, 1929  2 Sheets-Sheet 2
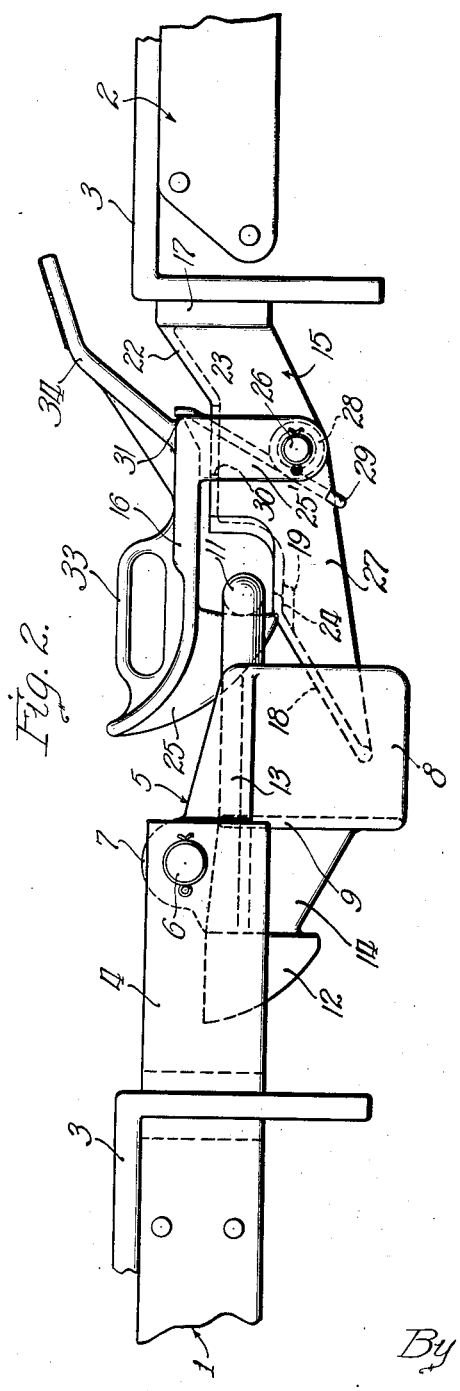
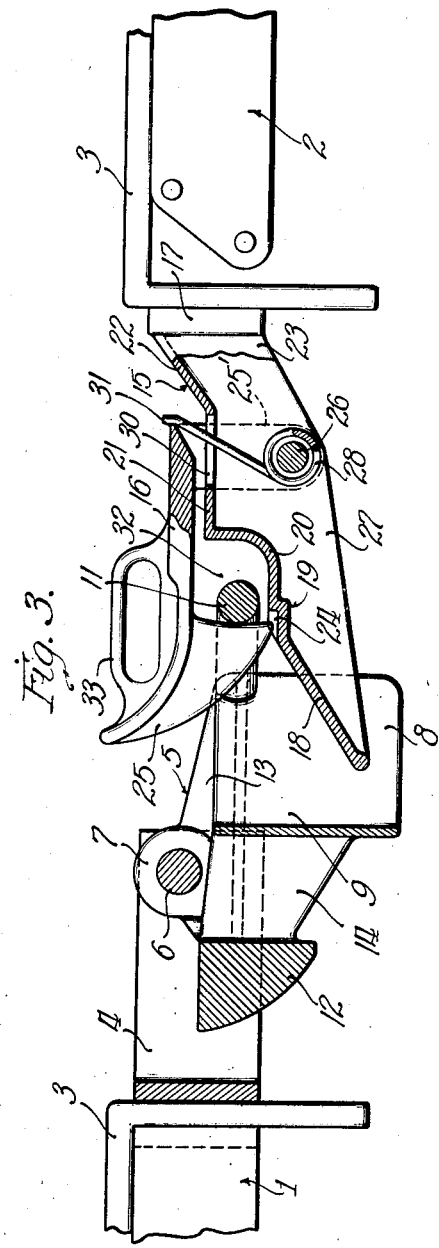
Inventor
Alfred O. Williams
By Brown, Jackson, Boettcher & Dienner
Attys.

Patented Aug. 30, 1932

1,874,147

UNITED STATES PATENT OFFICE

ALFRED O. WILLIAMS, OF BATTLE CREEK, MICHIGAN, ASSIGNOR TO CLARK TRUCTRACTOR COMPANY, OF BUCHANAN, MICHIGAN, A CORPORATION OF MICHIGAN

COUPLER

Application filed March 8, 1929. Serial No. 345,296.

This invention relates to coupling devices and more particularly to a coupler adapted for use in coupling together a tractor and a trailer or two or more trailers to form a train.

Coupling devices of the general character referred to are known in the art by means of which a tractor and a trailer, or two trailers, are automatically coupled together by relative movement of the same toward each other. In all coupling devices of this character with which I am familiar, a coupling ring or equivalent member is provided for coupling engagement with a draw bar, this ring being carried by a draw head and pivoted for movement independently thereof. In such coupling means it is known to provide a guide member or apron which receives the end portion of the tongue or draw bar so as to confine the same against excessive lateral movement in steering of the trailer, this apron being rigid with the head and the head itself being rigidly secured to the trailer or tractor platform.

This is objectionable, as the apron, and also the head, is subjected to excessive stresses, particularly when the trailer is travelling over uneven surfaces, such stresses being apt to cause breakage of the apron. This is particularly true, for instance, in the event that the trailer drops into a depression or hole. While this objection can be avoided to some extent, by employing a tongue or draw bar which is pivotally connected to the truck for free swinging movement, the provision of a draw bar mounted in this manner on the platform of the trailer is objectionable as rendering it difficult to assure proper aligning of the draw bar with the coupling ring or equivalent member of the draw head during the coupling operation.

One of the main objects of my invention is to provide a coupling means in which a draw bar rigidly secured to the platform of the trailer may be employed and the apron or guide member which receives the end of this draw bar is free for vertical movement in accordance with such movement of the trailer, thus preventing breakage of the apron due to relative vertical movement between the two trailers or the tractor and the trailer.

Another object of my invention is to provide a coupling head and an associated apron and coupling element which can be readily produced at comparatively small cost and are effectively braced, the coupling element being formed as an integral part of the coupling head and apron structure. A further object is to simplify construction of the parts of the coupler, eliminating all unnecessary parts and so associating the parts of the coupler as to permit a maximum of relative movement therebetween without permitting uncoupling of the parts and while preventing excessive lateral movement of the draw bar. Further objects and advantages will appear from the detailed description.

In the drawings:

Figure 2 is a side view of the coupler, with the parts in coupled relation, as applied;

Figure 3 is a section taken substantially on line 3—3 of Figure 1, parts being shown in elevation;

Figure 1:
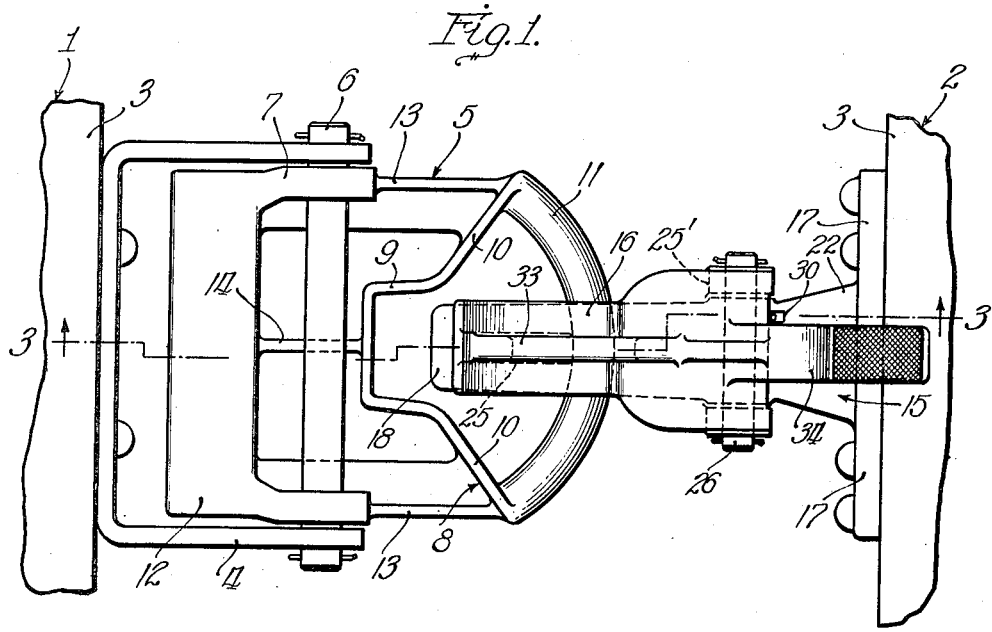
Figure 1 is a top plan view of a coupler in accordance with my invention as applied and with the parts in coupled relation, the platforms of two adjacent trailers being shown fragmentarily.
Figure 4:
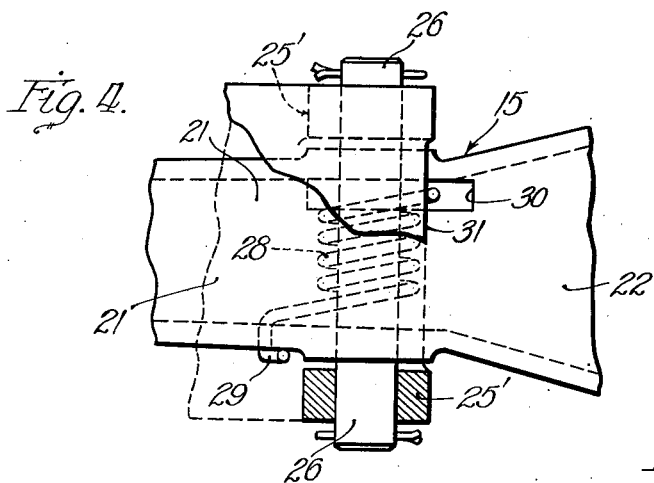
Figure 4 is a fragmentary plan view on an enlarged scale of the draw bar or tongue, partly broken away and in section.

I have illustrated my coupler as applied to two trailers 1 and 2, though it is equally capable of being used with a tractor and a trailer. A reinforcing angle bar 3 is secured to the platform of each trailer and extends about the same. A U-shaped bracket 4 is riveted or otherwise suitably secured to the reinforcing angle bar 3 of trailer 1. A coupling head 5 is pivotally mounted in bracket 4, for movement on a horizontal axis, by means of a pivot pin 6 passing through the ends of the arms of the bracket and through bearing eyes 7 of the head.

The coupling head comprises a depending apron 8 which includes a rectangular socket element 9 and wings 10 diverging outwardly from the side arms of the socket member. These wings define an inwardly converging passage for entrance of the coupling bar, and also serve to prevent excessive lateral movement of the draw bar relative to the coupling head when the train of trailers is in motion.

Wings 10 are connected, at their outer ends, by a coupling element 11, which in the form illustrated is formed integrally with the wings and is arched or curved outwardly therefrom. This element extends across the entrance to the passage defined by the wings. Element 11 is of circular cross section (Figure 3) but this cross section of the coupling element, though a preferred one, is not essential. The apron 8 and associated parts are disposed at one side of the axis of pin 6 and a counterweight 12 is disposed at the other side of such axis. This counterweight is connected to the wings of the apron by side arms 13 of substantially T-shape in cross section, these arms being formed integrally with the apron, that is, with wings 10 of the apron, and with the counterweight 12 and bearing eyes 7. Socket element 9 is connected to the counterweight 12 centrally thereof, by a web element 14. By this construction, I provide the apron as an integral part of the head, the head being preferably cast as a unit. The counterweight 12 is a proper value to counterbalance the apron and associated parts thus holding the head in substantially horizontal position. It will be noted that the coupling element 11 is arched outwardly away from the apron, thus facilitating coupling between two trailers, or a tractor and a trailer, which may be disposed at a decided angular relation laterally of the coupling head. It is also particularly pointed out, as will be noted more clearly from Figures 2 and 3, that the pin 6 is above the coupling element 11 so that pressure exerted on this element in the direction of trailer 1 will tend to rock the apron and, therefore, element 11, downwardly about pin 6.

The head 5 constructed and mounted in the manner illustrated and described cooperates with a coupling tongue or draw bar 15 and a latch member 16 mounted thereon. Draw bar 15 is provided with base flanges 17 riveted or otherwise suitably secured to reinforcing angle bar 3 of trailer 2. The draw bar is of channel cross section (Figures 2 and 3) and is inclined downwardly away from angle bar 3. At its outer end the draw bar is provided with an upwardly and inwardly inclined cam element 18 connected by a substantially horizontal element 19 to an element 20 of substantially L-shape in vertical section, this element 20 connecting elements 18 and 19 to web 21 at the top of the bar, this web being connected at its inner end to a web 22 of the downwardly inclined neck 23 of the bar. Element 19 is provided with a recess 24 which receives the end of bill 25 of latch member 16, this latch member being in the form of a hook.

Member 16 is provided, at its inner end, with depending ears 25' which straddle the body portion of draw bar 15. A pivot pin 26 is secured through the depending flanges 27 of the draw bar and through the lower ends of ears 25, this pin being confined against endwise movement in a suitable manner, as by means of cotter pins inserted therethrough. A wire spring 28 is mounted about pin 26 and has one end hooked about the lower edge of one flange 27 of the draw bar, at 29. The other arm of this spring extends upwardly through a slot 30 in web 21 and bears against the inner edge of latch or hook member 16 at 31.

As clearly shown in Figures 2 and 3, cam element 18 of the draw bar and bill 25 of the hook member 16, define a flaring passage which converges inwardly of the draw bar and is disposed in right angular relation to the passage of apron 8 of the coupling head. Upon relative movement of the coupling head and the draw bar toward each other, if these members be disposed in different planes, that is, at different heights above the supporting surface, bill 25 or cam element 18, as the case may be, will contact coupling element 11, so as to guide the same beneath the bill of the hook, the coupling head turning freely on the axis of pin 6 at such time. Upon continued relative movement of the draw bar and the coupling head toward each other member 16 is raised upwardly against the action of spring 28 permitting element 11 to pass into the space 32 defined by element 20 and bill 25. As element 11 passes inwardly beyond bill 25, member 16 is returned to closed or operative position, at which time bill 25 of this member engages over element 11, as in Figures 2 and 3. As will be noted more clearly from Figure 3, the inner face of bill 25 of the hook member, which contacts element 11, is preferably slightly curved or arched in such direction as to eliminate any tendency to lift member 16 due to pull exerted on the bill 25 thereof.

To facilitate uncoupling, the member 16 is preferably provided with a suitable handle 33 on the upper face thereof and adjacent bill 25. This member is also provided with a pedal 34 extending upwardly from the rearward portion of member 16 at an inclination thereto and toward angle bar 3 of the trailer 2.

An operator on the platform of trailer 2 can readily release this trailer from the trailer 1 by the simple expedient of exerting downward pressure on pedal 34 with the foot. The handle 33 provides convenient means whereby a person standing on the ground can readily uncouple the draw bar and the coupling head.

With the draw bar and the coupling head in coupled position, the draw bar 15 extends into the apron 8 between the wings 10 thereof so that proper steering of the trailer, particularly when making a turn, is assured and excessive lateral movement between the trailers, or between the front trailer and tractor, is prevented. Upon movement of the trailers toward each other beyond full coupling position, element 11 contacts the vertical arm of the L-shaped element 20 of the draw bar. As previously pointed out, the coupling head has movement about an axis above element 11. As a result, when element 11 contacts the vertical wall of element 20, there is a tendency for the head to rock about the axis of pin 6 creating a downward pressure of element 11 on the horizontal arm of element 20. This effectively eliminates possibility of element 11 passing out of contact with the draw bar when backing. This feature is of importance as eliminating possibility of uncoupling of the trailers due to overrunning thereof, as when the tractor is suddenly stopped when drawing a train of trailers. It is also of value in backing, as when coupling one trailer onto another, or when it is necessary to back a train of trailers.

An important feature of my invention is that the apron 8 which confines the draw bar against excessive lateral movement is carried by the coupling head, this head having movement on a horizontal axis, thus permitting swinging of the apron and eliminating possibility of breakage thereof such as is apt to occur where the apron is rigidly secured in position. By providing the coupling element 11 carried by the apron, proper movement of this element to facilitate the coupling opertion is permitted and the coupling element as well as the apron is normally held in substantially horizontal position by the counterweight at the other side of the axis of pin 6. By forming the apron and the coupling element together in a single structure, I provide a coupling means of simple and inexpensive, but highly efficient construction.

What I claim is:

1. In coupling means of the character described, a coupling head pivoted on a horizontal axis and comprising an apron and a counterweight disposed at opposite sides of such axis, the apron comprising outwardly diverging wings, a coupling member connecting the wings at their outer ends and rigid therewith, and a draw bar comprising a hook member disposed and adapted for coupling engagement with said coupling element upon relative movement of the head and the bar toward each other into operative relation.

2. In coupling means of the character described, a coupling head pivoted on a horizontal axis and comprising an apron and a counterweight disposed at opposite sides of such axis, the apron comprising outwardly diverging wings, a coupling member connecting the wings at their outer ends and rigid therewith, a draw bar, and a hook member pivoted on the draw bar and normally held in closed relation thereto, said hook member having a cam surface disposed to contact the coupling element of the head during relative movement of said head and bar toward each other into coupling position, the hook member engaging about the coupling element as it reaches full coupling position, said bar being held against vertical movement.

3. In coupling means of the character described, a coupling head pivoted on a horizontal axis and comprising a depending apron and a counterweight disposed at opposite sides of such axis, said apron comprising wings defining an inwardly converging passage, a coupling element extending across the entrance to said passage and rigid with the wings, a draw bar held against downward movement and adapted to enter said passage, and a hook member pivoted on the upper side of the draw bar and disposed and adapted to engage over the coupling element of the head, said hook member being normally in lowered position, the draw bar and the hook member being provided at their outer ends with cam surfaces defining a passage disposed at right angles to and flaring toward said coupling element.

4. In coupling means of the character described, a coupling head pivoted on a horizontal axis and comprising a depending apron and a counterweight disposed at opposite sides of such axis, said apron having an outwardly flaring vertical passage, a coupling element extending across the passage and rigid with the apron, said element being below the axis of movement of the head, a draw bar adapted to enter said passage, and provided at its leading end with an upwardly and inwardly inclined cam surface, and a hook member at the upper side of the bar and pivoted at its inner end thereto, said member being adapted for engagement over the coupling element of the head and being urged in closing direction toward the bar, the outer end of the hook member having a cam surface inclined oppositely to the cam surface of the bar and forming therewith an outwardly flaring passage at right angles to said coupling element of the head.

5. In coupling means of the character described, a coupling head pivoted on a horizontal axis and comprising a depending apron and a counterweight disposed at opposite sides of such axis, said apron having an outwardly flaring vertical passage, a coupling element extending across the passage and rigid with the apron, said element being below the axis of movement of the head, a draw bar adapted to enter said passage, and means comprising a hook member carried by the bar for coupling it to said element upon relative movement of the head and the bar toward each other into operative relation, the bar having an L-shaped element defining with the bill of the hook member a space for receiving and retaining the coupling element of the head, said coupling element contacting the vertical arm of said L-shaped element when backing, the draw bar being held against downward movement.

6. In coupling means of the character described, a coupling head mounted on a pivotal axis and comprising an apron at one side of the axis and a counterweight at the other side of said axis, the apron defining a passage for reception of a draw bar, and a coupling element rigid with the apron and extending across the entrance to said passage.

7. In coupling means of the character described, a coupling head pivoted on a horizontal axis and comprising a counterweight at one side of the axis and a depending apron at the other side of said axis, the apron comprising wings defining a passage for reception of a draw bar, and a coupling element rigid with the wings and extending across the entrance to said passage, said element being arched outwardly of the passage.

In witness whereof, I hereunto subscribe my name this fourth day of March, 1929.

ALFRED O. WILLIAMS.